May 5, 1931. F. H. OWENS 1,803,346
MEANS AND METHOD FOR RECORDING PHOTOGRAPHIC SOUND RECORDS
Filed Sept. 17, 1928
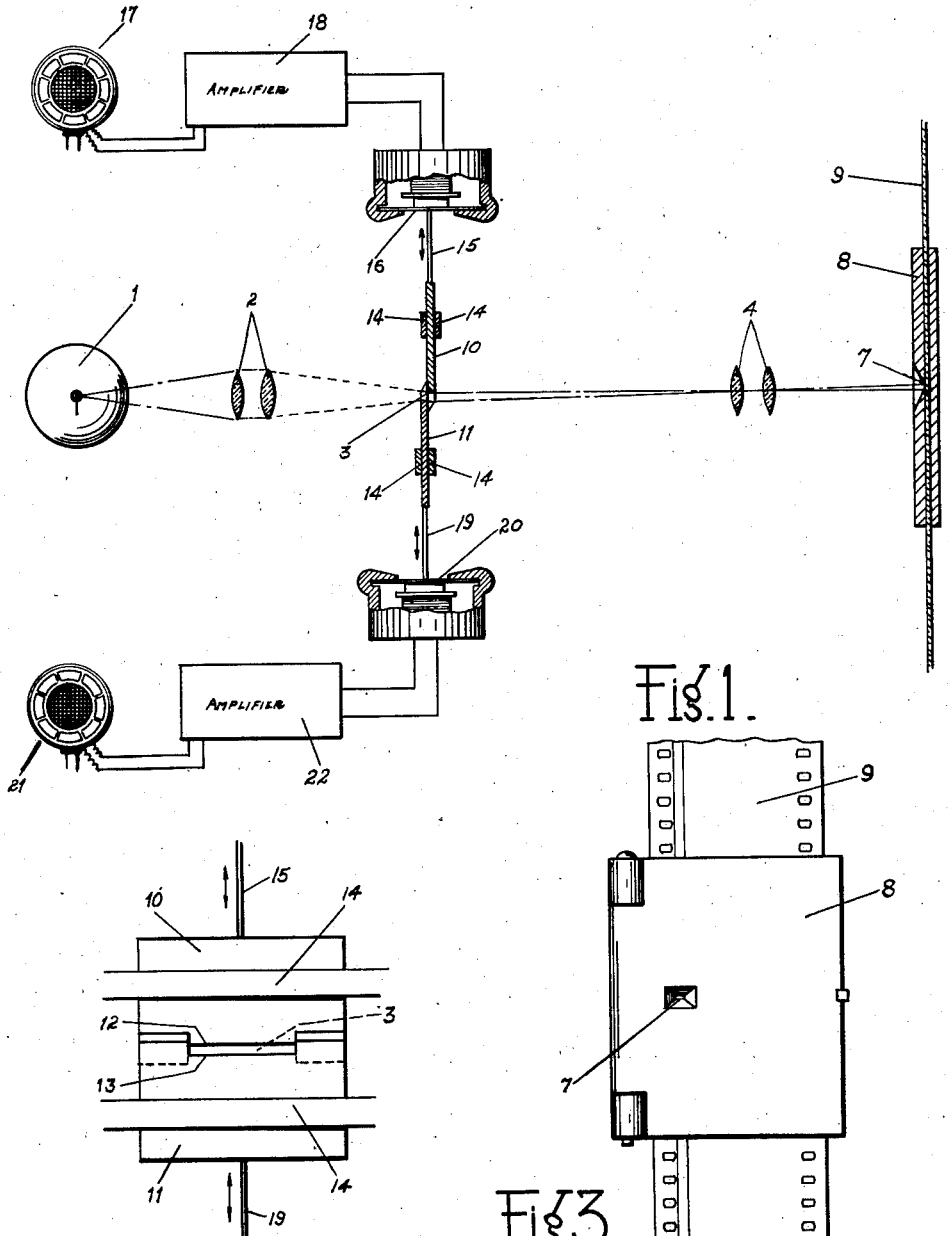

Patented May 5, 1931

1,803,346

UNITED STATES PATENT OFFICE

FREEMAN H. OWENS, OF NEW YORK, N. Y.

MEANS AND METHOD FOR RECORDING PHOTOGRAPHIC SOUND RECORDS

Application filed September 17, 1928. Serial No. 306,494.

My invention relates to a means and method for recording photographic sound records and has for its primary object a method for recording sound upon photographic film using a source of light of constant intensity.

Another object of my invention is to provide a means and method for modulating the light rays passing from a constant source to the photographic film, by means of an adjustable slit through which such light passes.

Other objects and advantages in details of form and construction will be apparent as the description proceeds, reference being had to the figures of the accompanying drawing forming a part of this application and wherein like reference numerals indicate like parts.

In the drawing:—

Figure 1 is a diagrammatic illustration of my invention certain apparatus being shown in section and broken away for clearness.

Figure 2 is a detail front view of the adjustable slit member.

Figure 3 is a detail front view of the photographic film gate.

In carrying out my invention, I provide the lamp 1 of constant intensity, the light rays of which are caught and focused upon a slit 3, said slit being adjustable and variable as will be presently described. The light rays, passing through the slit 3, are caught by the lenses 4 and focused upon an opening 7 in a suitable film gate 8, through which is adapted to be moved in any suitable or desired manner, a strip of photographic film 9, whereby the light rays will be photographed upon such film to form a sound record. The slit 3 is formed by two overlapping plates 10 and 11, each provided centrally with cut out portions 12, and 13, whereby to provide the slit 3 between them. One or both of the plates 10 and 11 may be adjustable whereby to vary the size of the slit 3 and consequently the amount of light passing therethrough. Guide straps 14 serve to properly guide the plates 10 and 11 in their sliding movement or adjustment.

One end of the plate 10 is provided with a pin connection 15, to a diaphragm 16, the vibration of which is controlled by amplified sound originating in a microphone 17 or other suitable device, and amplified by any suitable amplifier 18. The details of these units have been omitted, as they form no part of this invention except in combination hereinafter claimed. Suffice it to say that the sound waves are converted into electric impulses, amplified, and such impulses result in vibrations of the diaphragm 16 in accordance with the original sound waves. The vibration of the diaphragm 16 obviously causes the plate 10 to slide in its guide toward and away from the plate 11, thus adjusting or controlling the size of the slit 3 in accordance with the sound waves.

As before stated, if desired the plate 11 for instance can remain stationary and the slit adjustment accomplished by the movement of the plate 10 in the manner just described. It is entirely feasible however and in many instances preferable, that the both plates 10 and 11 are oscillated or adjusted for regulating the size of the slit 3. Therefore, a pin connection 19 is provided between the end of the plate 11 and a diaphragm 20 is served by the microphone 21 and amplifier 22. Obviously, therefore, as the sound produced in the microphones 17 and 21 vibrates the diaphragms 16 and 20 synchronously, the plates 10 and 11 will be oscillated toward and away from each other and the size of the slit 3 will vary in accordance with the diaphragm vibrations. Thus the light passing through the slit 3 will vary and be modulated in accordance with the sound waves causing the vibration of the diaphragm. Resultant photographic records on the film 9 will accurately represent the original sound waves.

It should be here stated that if desired, instead of two microphones and amplifiers being used, the output could be divided between the diaphragms 16 and 20. Obviously, many other changes in details of form and arrangement may be made without departing from the spirit and scope of my invention. I do not limit myself therefore, to the exact form herein shown and described other than by the appended claims.

I claim:—

1. Means for recording photographic sound records comprising a light source of constant intensity, a slit variable as to size thru which the light from said source is adapted to pass, a plurality of electromagnetically operated means associated with a plurality of plates respectively for varying the size of said slit in accordance with the sound to be recorded, and means for photographing the modulated light rays from said variable slit on a sensitized film.

2. Means for recording photographic sound records comprising a light source of constant intensity, a slit variable as to size thru which the light from said source is adapted to pass, said slit including two plates independently movable to vary the size of said slit, electromagnetically controlled diaphragms having connections to said plates respectively, whereby the size of said slit is varied in accordance with the sound to be recorded, and means for photographing the modulated light rays from said slit on a sensitized film.

3. Means for recording photographic sound records comprising a light source of constant intensity, a slit variable as to size thru which the light from said source is adapted to pass, said slit including a pair of overlapping plates movable toward and away from each other to vary the size of said slit, a pair of individual electromagnetically controlled diaphragms connected to said plates respectively, whereby the size of said slit is varied in accordance with the sound to be recorded, and means for photographing the modulated light rays from said variable slit on a sensitized film.

4. Means for photographically recording sound comprising in combination a source of luminous energy, a light sensitive film, a pair of overlapping plates providing an aperture for admitting said energy to said film, said plates independently movable for varying the physical dimensions of said aperture, and individual electromagnetic means associated with said plates for actuating said plates respectively.

5. Means for photographically recording sound comprising in combination a source of luminous energy, a light sensitive film, a pair of overlapping plates providing an aperture for admitting said energy to said film, said plates independently movable for varying the physical dimensions of said aperture, individual electromagnetic means associated with said plates for actuating said plates respectively, and individual energizing circuits for said electromagnetic means.

In testimony whereof, I affix my signature.

FREEMAN H. OWENS.